(12) United States Patent
Bharti et al.

(10) Patent No.: US 10,432,759 B2
(45) Date of Patent: Oct. 1, 2019

(54) CENTRALIZED CHROMATIC PLURALIZING OF INTERNET OF THINGS (IOT) COMMUNICATION

(71) Applicant: International Business Machines Corporation, Armonk, NY (US)

(72) Inventors: Harish Bharti, Pune (IN); Rajesh Kumar Saxena, Mumbai (IN); Sandeep Sukhija, Noida (IN)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 15/797,364

(22) Filed: Oct. 30, 2017

(65) Prior Publication Data

US 2019/0132429 A1    May 2, 2019

(51) Int. Cl.
*H04L 29/06* (2006.01)
*H04L 29/08* (2006.01)
*G06F 16/2455* (2019.01)

(52) U.S. Cl.
CPC ........ *H04L 69/22* (2013.01); *G06F 16/24568* (2019.01); *H04L 67/12* (2013.01)

(58) Field of Classification Search
CPC ................................ H04L 67/12; H04L 69/22
USPC .......................................................... 370/474
See application file for complete search history.

(56) References Cited

U.S. PATENT DOCUMENTS

| 8,108,092 | B2 | 1/2012 | Phillips et al. |
| 8,458,329 | B2 | 6/2013 | Kolin et al. |
| 2009/0281674 | A1 | 11/2009 | Taft |
| 2018/0060153 | A1* | 3/2018 | Innes .................... G06F 11/079 |
| 2018/0241813 | A1* | 8/2018 | Funk ................... H04L 67/2819 |

FOREIGN PATENT DOCUMENTS

| WO | 2016137848 A1 | 9/2016 |
| WO | 2016153640 A1 | 9/2016 |
| WO | 2016207686 A1 | 12/2016 |

\* cited by examiner

*Primary Examiner* — Natasha W Cosme
(74) *Attorney, Agent, or Firm* — Brown & Michaels, PC; Christopher Pignato

(57) ABSTRACT

Assigning chromatic numbers based on a pre-assigned scheme to a stream of sensor data from sensors of Internet connected devices to "color" the message which can then be processed by chromatic number to obtain a pluralized stream of data.

25 Claims, 8 Drawing Sheets

CENTRALIZED CHROMATIC PLURALIZING OF INTERNET OF THINGS (IOT) COMMUNICATION

BACKGROUND

The present invention relates to communications from Internet of Things (IoT) devices, and more specifically to centralized, chromatic pluralizing of IoT communication.

The "Internet of Things" (commonly abbreviated as "IoT") is the networking of physical devices (also referred to as "connected devices" and "smart devices"), buildings, and other items. These "things" have embedded electronics, software, sensors, actuators, and network connectivity that enable these objects to collect and exchange data across a global network. Where the things are sensors, the sensors can create a continual or near continual stream of data for processing.

The data produced by these sensors in multiple devices is massive in volume and can be in different formats. This massive volume of data needs to be processed within a very short amount of time, for example, a span of milliseconds, to maximize the benefit of such data and execute any corrective action which may be necessary. Due to the volume of data being collected, it can be a problem for the data captured by these devices and their associated sensors to be stored and fully managed within central databases, as the data needs to be aggregated and analyzed within a very short time.

As shown in prior art FIG. 8, the sensor data from the IoT devices is sent in packets 35a-35n each of which consists of a header, subdivided into a mandatory fixed header 30 and optional extension headers 31a-31n, having control information for addressing and routing, and a payload consisting of an upper-layer header 32 and the sensor data 33.

The extension headers 31a-31n may carry Internet Layer information, and are placed between the fixed header 30 and the upper-layer protocol header 32. The headers form a chain, and are typically updated and added as the packet 35a-35n progresses through the Internet from its origin to its destination.

The prior art does not have a mechanism which uses chromatic numbers to represent sensor data for faster processing via an extension header of the sensor data.

SUMMARY

According to one embodiment of the present invention, a method of pluralizing an incoming stream of data from Internet connected devices for processing by a centralized database is disclosed. The method comprising the steps of: a computer receiving a sensor data stream from the Internet connected devices; the computer obtaining a chromatic number to be used for each sensor data point within the sensor data stream; the computer generating a data packet with each sensor data point and the chromatic number; and the computer sending the data packet to a framework for pluralization and output of pluralized data based on the chromatic number.

According to another embodiment of the present invention, a computer program product for pluralizing an incoming stream of data from Internet connected devices for processing by a centralized database by a computer is disclosed. The computer comprising at least one processor, one or more memories, one or more computer readable storage media, the computer program product comprising a computer readable storage medium having program instructions embodied therewith, the program instructions executable by the computer to perform a method comprising: receiving, by the computer, a sensor data stream from the Internet connected devices; obtaining, by the computer, a chromatic number to be used for each sensor data point within the sensor data stream; generating, by the computer, a data packet with each sensor data point and the chromatic number; and sending, by the computer, the data packet to a framework for pluralization and output of pluralized data based on the chromatic number.

According to another embodiment of the present invention, a computer system for pluralizing an incoming stream of data from Internet connected devices for processing by a centralized database is disclosed. The computer system comprising a computer comprising at least one processor, one or more memories, one or more computer readable storage media having program instructions executable by the computer to perform the program instructions comprising: receiving, by the computer, a sensor data stream from the Internet connected devices; obtaining, by the computer, a chromatic number to be used for each sensor data point within the sensor data stream; generating, by the computer, a data packet with each sensor data point and the chromatic number; and sending, by the computer, the data packet to a framework for pluralization and output of pluralized data based on the chromatic number.

According to another embodiment of the present invention, a method of pluralizing data packets of a stream of data from Internet connected devices is disclosed. The method comprising the steps of: a computer receiving a plurality of incoming streams of data packets each containing a sensor data point from the Internet connected devices and a chromatic number; the computer parsing the incoming steam of data packets to extract events based on the chromatic number of the data packet; the computer sorting the extracted events based on the chromatic number within a period of time; and the computer analyzing and outputting data based on the period of time to create a new data packet based on the chromatic number.

According to another embodiment of the present invention, a computer program product for pluralizing data packets of a stream of data from Internet connected devices by a computer is disclosed. The computer comprising at least one processor, one or more memories, one or more computer readable storage media, the computer program product comprising a computer readable storage medium having program instructions embodied therewith, the program instructions executable by the computer to perform a method comprising: receiving, by the computer, a plurality of incoming streams of data packets each containing a sensor data point from the Internet connected devices and a chromatic number; parsing, by the computer, the incoming steam of data packets to extract events based on the chromatic number of the data packet; sorting, by the computer, the extracted events based on the chromatic number within a period of time; and analyzing and outputting, by the computer, data based on the period of time to create a new data packet based on the chromatic number.

According to another embodiment of the present invention, a computer system for pluralizing data packets of a stream of data from Internet connected devices is disclosed. The computer system comprising a computer comprising at least one processor, one or more memories, one or more computer readable storage media having program instructions executable by the computer to perform the program instructions comprising: receiving, by the computer, a plurality of incoming streams of data packets each containing a sensor data point from the Internet connected devices and a chromatic number; parsing, by the computer, the incoming steam of data packets to extract events based on the chromatic number of the data packet; sorting, by the computer, the extracted events based on the chromatic number within a period of time; and analyzing and outputting, by the computer, data based on the period of time to create a new data packet based on the chromatic number.

DETAILED DESCRIPTION

In an embodiment of the present invention, a framework to manage the data collected by the IoT devices is disclosed, such that analytics on a central database of such data can be performed in less time. The framework increases the efficiency of the network and the computer performing analytics on the central database. The framework uses a chromatic number to represent sensor data for faster processing. Since chromatic numbers are generated during a particular period for a sensor and are processed by multiple nodes, the analysis speed is increased. Furthermore, the need of processing of IoT data for interpreting values is removed, improving the performance of the IoT devices.

Figure 1:
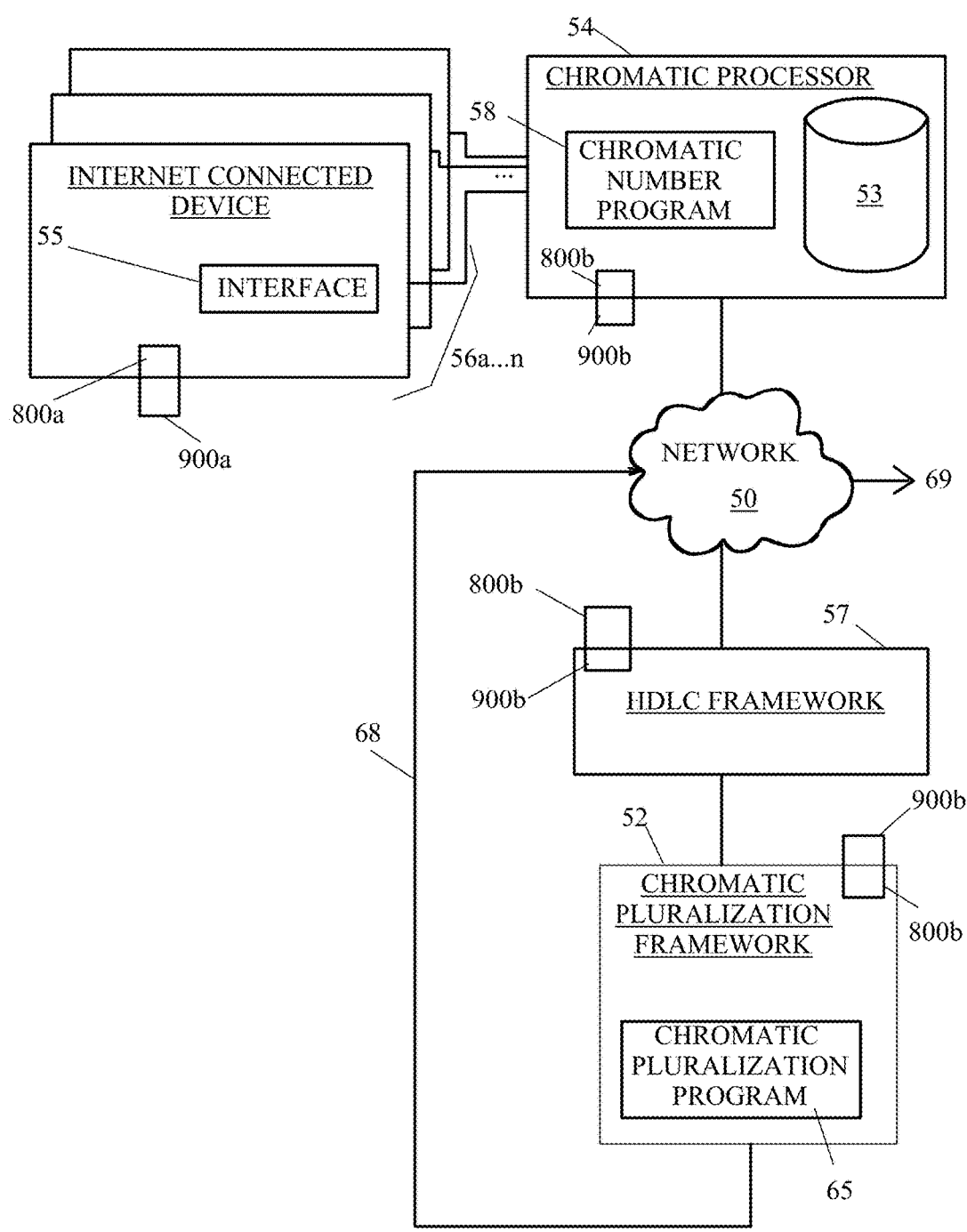
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

The Internet connected device (ICD) 56a-56n may be a mobile device, computer, a personal device or any other device with a sensor for capturing data regarding a variable and is connected to the Internet. The Internet connected device (ICD) 56a-56n may contain an interface 55, which may accept commands and data entry from a user. The interface 55 can be, for example, a command line interface, a graphical user interface (GUI), a natural user interface (NUI) or a touch user interface (TUI). The Internet connected device 56a-56n includes a set of internal components 800a and a set of external components 900a, further illustrated in FIG. 7. The Internet connected device (ICD) 56a-56n can transmit raw data collected by a sensor to other components on network 50 as well as other networks. The raw data collected may include, but not limited to data regarding temperature, motion, lighting, entertainment, consumption, use, surveillance, resource usage, etc. . . . and preferably includes a time stamp.

The raw data from the ICD devices 56a-56n is sent to the network 50 via a chromatic processor 54. Chromatic processor 54 includes a set of internal components 800b and a set of external components 900b illustrated in FIG. 7. In the depicted example, chromatic processor 54 provides a chromatic number to be added to the raw data received from the Internet connected devices 56a-56n. The chromatic processor 54 preferably includes a chromatic number program 58 for generating a data packet with a header which is padded with a chromatic number and includes the raw data. The chromatic number is obtained from a repository 53, which preferably includes mapping of chromatic numbers and range value, as well as condition based business rules or logic business rules. The repository 53 may additionally include a pre-configured, customizable database which will store the chromatic number relative to different sets of business rules to be applied on sensor data. These business rules can support range values, simple and/or logic business rules. For example, chromatic number "1" (Green) may be set for temperature range 14 and 22, chromatic number "2" (which depicts amber) for temperature range between 23 and 30, and chromatic number "3" (depicts red) for temperature greater than 30. In this same example, the business rules may be defined based on multiple variable-like combination of temperature and humidity with to combination of and/or conditions etc.

The data packet with the assigned chromatic number is then sent to a High-Level Data Link (HDLC) framework 57 through the network 50 from the chromatic processor 54. The HDLC framework 57 is a framework which receives the data packets which include the chromatic number. The HDLC framework 57 forwards the data packets to the chromatic pluralization framework 52 for further processing. The HDLC framework 57 also adds a framework flag (a fixed bit) to represent the start and end of a message. The framework flag is used to apply a standard for bit padding to add a chromatic number in the message.

Figure 7:
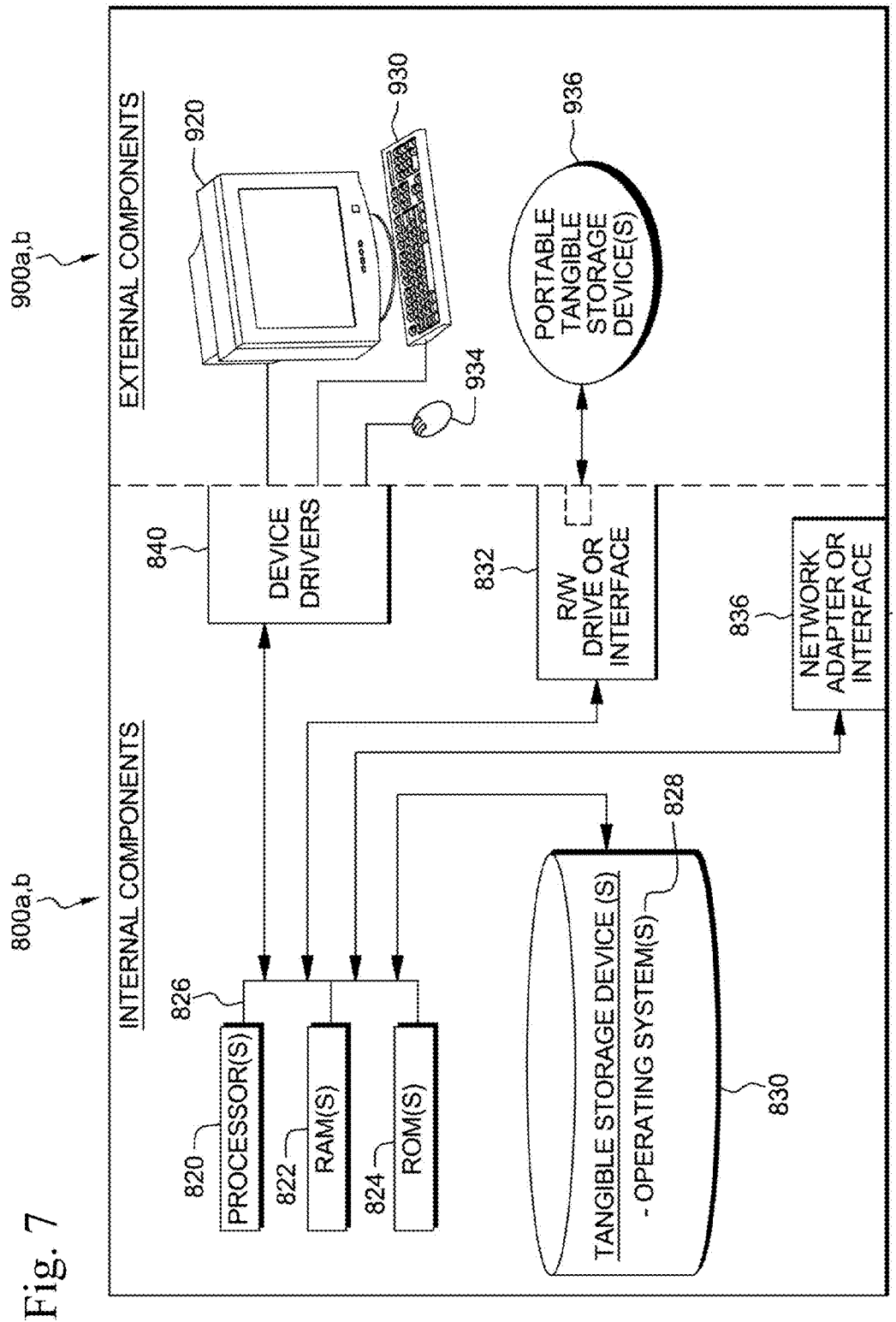
FIG. 7 illustrates internal and external components of components of the network, IoT devices, chromatic pluralization framework, server computer, and HDLC framework in which illustrative embodiments may be implemented.
Figure 8:
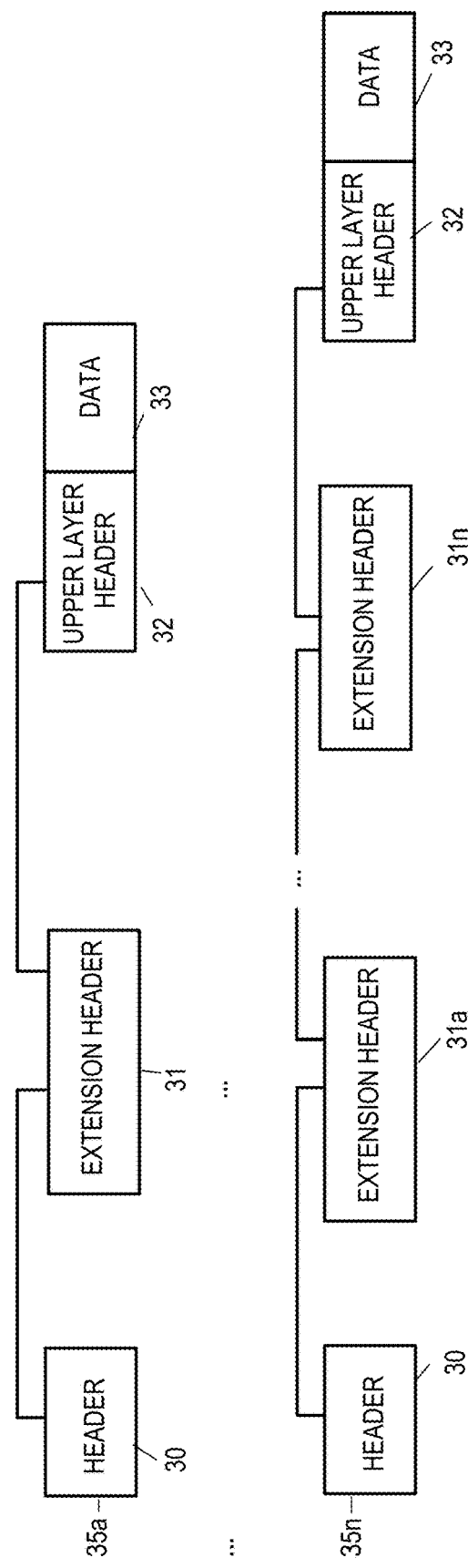
FIG. 8 shows the conventional structure of data as sent along a network.

The HDLC framework 57 includes a set of internal components 800b and a set of external components 900b illustrated in FIG. 7.

The chromatic pluralization framework 52 is a framework which receives the data packets with the chromatic number in different data streams in real time. The data packet preferably includes the sensor data, chromatic number in at least one extension header, and framework flag. The chromatic pluralization framework 52 may include resilient distributed datasets (RDD) across multiple nodes which can be utilized in parallel. The chromatic pluralization framework 52 additionally conducts sort and parse operations which may be executed by a chromatic pluralization program 65. The chromatic pluralization framework 52 includes a set of internal components 800b and a set of external components 900b illustrated in FIG. 7.

In the depicted example, Internet connected device (ICD) 56a-56n via the chromatic processor 54 with a repository 53, a chromatic pluralization framework 52, and a High-Level Data Link (HDLC) framework 57 are connect to network 50. In other exemplary embodiments, network data processing system 51 may include additional client or device computers, storage devices or repositories, server computers, and other devices not shown.

Program code and programs such as chromatic number program 58 and chromatic pluralization program 65 may be stored on at least one of one or more computer-readable tangible storage devices 830 shown in FIG. 7, on at least one of one or more portable computer-readable tangible storage devices 936 as shown in FIG. 7, or in repository 53 connected to network 50, or may be downloaded to an Internet connected device 56a-56n, HDLC framework 57, chromatic pluralization framework 52, or chromatic processor computer 54, for use. For example, program code and programs such as chromatic number program 58 and chromatic pluralization program 65 may be stored on at least one of one or more storage devices 830 on chromatic processor 54 and downloaded to an Internet connected device 56a-56n, HDLC framework 57, or chromatic pluralization framework 52 over network 50 for use. Alternatively, chromatic processor 54 can be a web server, and the program code, and programs such as chromatic number program 58 and chromatic pluralization program 65 may be stored on at least one of the one or more storage devices 830 on chromatic processor 54 and accessed by an Internet connected device 56a-56n, HDLC framework 57, or chromatic pluralization framework 52. In other exemplary embodiments, the program code, and programs such as chromatic number program 58 and chromatic pluralization program 65 may be stored on at least one of one or more computer-readable storage devices 830 on an Internet connected device 56a-56n, HDLC framework 57, chromatic pluralization framework 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Chromatic numbers are numbers which are assigned to data, grouping the data by "colors" such that the minimum number of "colors" are used which are needed to color the vertices of a graph such that no two adjacent vertices have the same "color". The chromatic numbers do not necessarily represent real spectrum colors, but may be referred to by those names—red, orange, yellow, etc.—for explanatory purposes.

Figure 2:
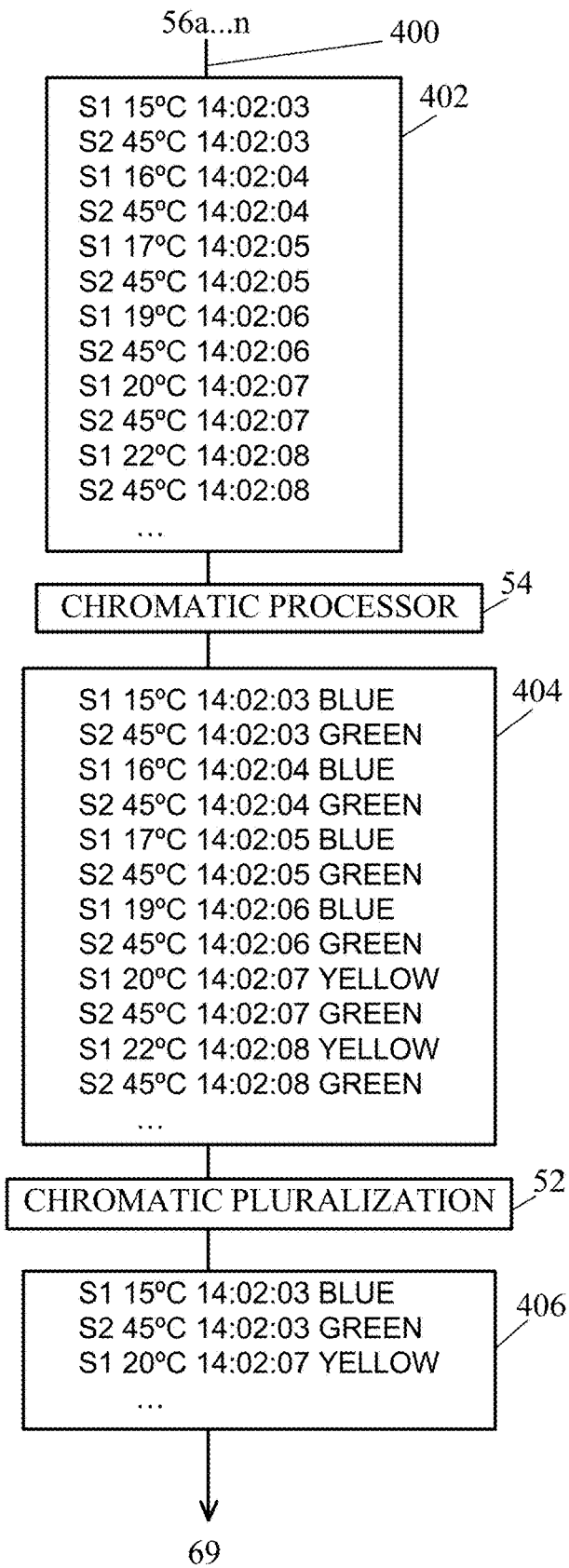
FIG. 2 shows an example of sensor data as processed by the chromatic pluralization method.

FIG. 2 shows an example of how such chromatic numbers might be assigned to a stream 400 of sensor data 402 from sensors of Internet connected devices 56a-56n. In the example, the sensors of the Internet connected devices 56a-56n are temperature sensors, each measuring a temperature and reporting the temperature once a second. The sample data stream 402 from the Internet connected devices sensors 56a-56n consists of a sensor identification, a temperature reading, and a time stamp. For example purposes, data values for only two sensors, coded as S1 and S2, are provided, although it will be understood that data from any number of sensors 56a-56n might be included in the stream 400, and the data might include any sort of information in addition to that shown.

The raw data stream 402 is input to the chromatic processor 54, which assigns chromatic numbers to each of the data packets based on a pre-assigned scheme. These chromatic numbers will be derived from a configuration database, for example repository 53, based upon range values and condition based business rules. The chromatic numbers are mapped with a range of values.

An IoT (Internet of Things) or Internet connected devices device 56a-56n is calibrated to provide a metric (e.g. temperature). This metric follows a range (e.g. 20 to 120). Conventionally, the data of the message includes just the metric reading (e.g. temperature reading) with a time stamp as to when the metric was collected, which leads to message flooding at an integrator of a centralized database, which has to do an additional pattern matching. In contrast, an embodiment of the present invention allows for fast track parsing to decrease the message flooding at the integrator. In an embodiment of the present invention, the chromatic number, which symbolically 'colors' the message from the IoT device, is added to the metric and transmitted to the integrator of a chromatic pluralization framework 52. For example, if the metric were temperature, then the temperature range in which data was being collected would be calibrated into divisions of 10, starting from 20, with each division being represented by a chromatic number.

In the example, the sensors of the Internet connected devices 56a-56n will be sensing temperatures in the range of 0° C. to 59° C., so the chromatic numbers might be assigned as follows:

| Value Range | Color |
|---|---|
| 0°-9° | VIOLET |
| 10°-19° | BLUE |
| 20°-29° | YELLOW |
| 30°-39° | ORANGE |
| 40°-49° | GREEN |
| 50°-59° | RED |

The chromatic processor 54 thus assigns chromatic numbers to the raw data 402, resulting in a coded data stream 404. The chromatic numbers can be added to the packet header—for example in the extension header, or, if desired, anywhere else in the packet header. Alternatively, the chromatic numbers can be stored by reserving bytes in the data part of the packet 33.

The sensor data with the chromatic numbers in the extension header are then sent to a chromatic pluralization framework 52 for additional processing, resulting in a pluralized data stream 406. Prior to the coded data stream 404 being sent to the chromatic pluralization framework 52, the coded data stream 404 may be sent to a HDLC framework 57, which then sends the coded data stream 404 to the chromatic pluralization framework 52.

As can be seen in FIG. 2, the amount of data in the coded data stream 404 is reduced significantly by this pluralization. The pluralized data stream 406 can then be sent to a central processor 69, as in the prior art, for whatever processing the system performs.

The chromatic pluralization framework 52 can be implemented as a multi-node model such as RDD (Resilient Distributed Datasets) which uses multi-node processing language such as SPARK RDD to parse a message from different streams of incoming data from sensors. These RDD's are processed by multi-nodes in parallel to parse the messages rapidly and check the messages for sorted events. Alternatively, if the data could be processed without the use of parallel processing using multiple nodes.

A sort operation is conducted on the events extracted from these messages based upon chromatic numbers in the header. The chromatic pluralization framework 52 receives data in real time for further analyzation. Each event is tagged to be in a period of time. Data analysis for a particular period is then conducted based on the chromatic numbering. Since all of the RDD's are stored in memory, the analysis speed is increased significantly in comparison to sending all data to a centralized database as it occurs in real time.

By using chromatic numbering as described above and applied to sensor data 402, fewer bytes with actual sensor data are passed for further processing 69 in the pluralized stream 406. These bytes will be used to depict pre-configured chromatic numbers which represent the different state/range of actual data associated with them, enabling the integrator of the chromatic pluralization framework to parse the data quickly.

Figure 3:
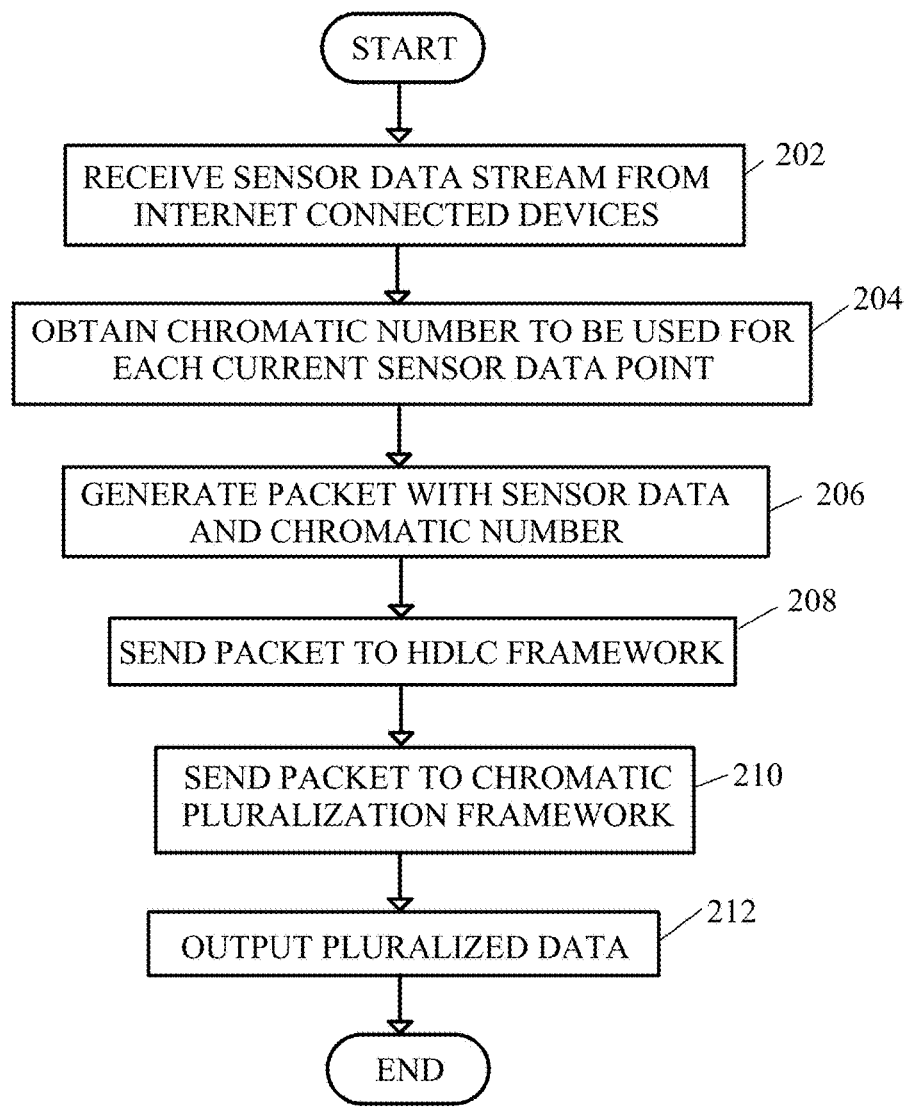
FIG. 3 shows a flow diagram of a method of chromatic numbering padding.

FIG. 3 shows a flow diagram of a method of chromatic numbering padding of raw data received by the In a first step, sensor data streams are received from the Internet connected devices 56a-56n (step 202) by the chromatic processor 54.

The chromatic processor 54 obtains a chromatic number to be used for each current sensor data point to be sent to the chromatic pluralization framework (step 204), for example by the chromatic number program 57.

The chromatic processor 54 then generates a packet with sensor data and chromatic number (step 206). The chromatic number is preferably added to the packet header—for example in the extension header, or, if desired, anywhere else in the packet header.

Prior to generating the padded packet with the chromatic number, a signal-to-noise ratio (difference in decibels between the received signal and the background noise level) may be measured from the Internet connected devices 56a-56n to compare to a threshold to determine whether the data stream is good for further processing. If the signal-to-noise ratio is less than a threshold, a data packet containing the data from the internet connected devices 56a-56n is not sent to the chromatic pluralization framework 52 for pluralization. Alternatively, the signal-to-noise ratio may be compared to a threshold as soon as the raw data is received by the chromatic processor 52 and prior to obtaining a chromatic number to be associated with the raw data from the Internet connected devices 56a-56n.

The padded packet is then sent to the HDLC framework 57 by the chromatic processor 54 (step 208). The HDLC framework 57 preferably adds framework flags to the data packet.

The packet is then sent by the HDLC framework to the chromatic pluralization framework 52 (step 210) and the chromatic pluralization framework 52 outputs pluralized data to for additional processing and the method ends.

Figure 4:
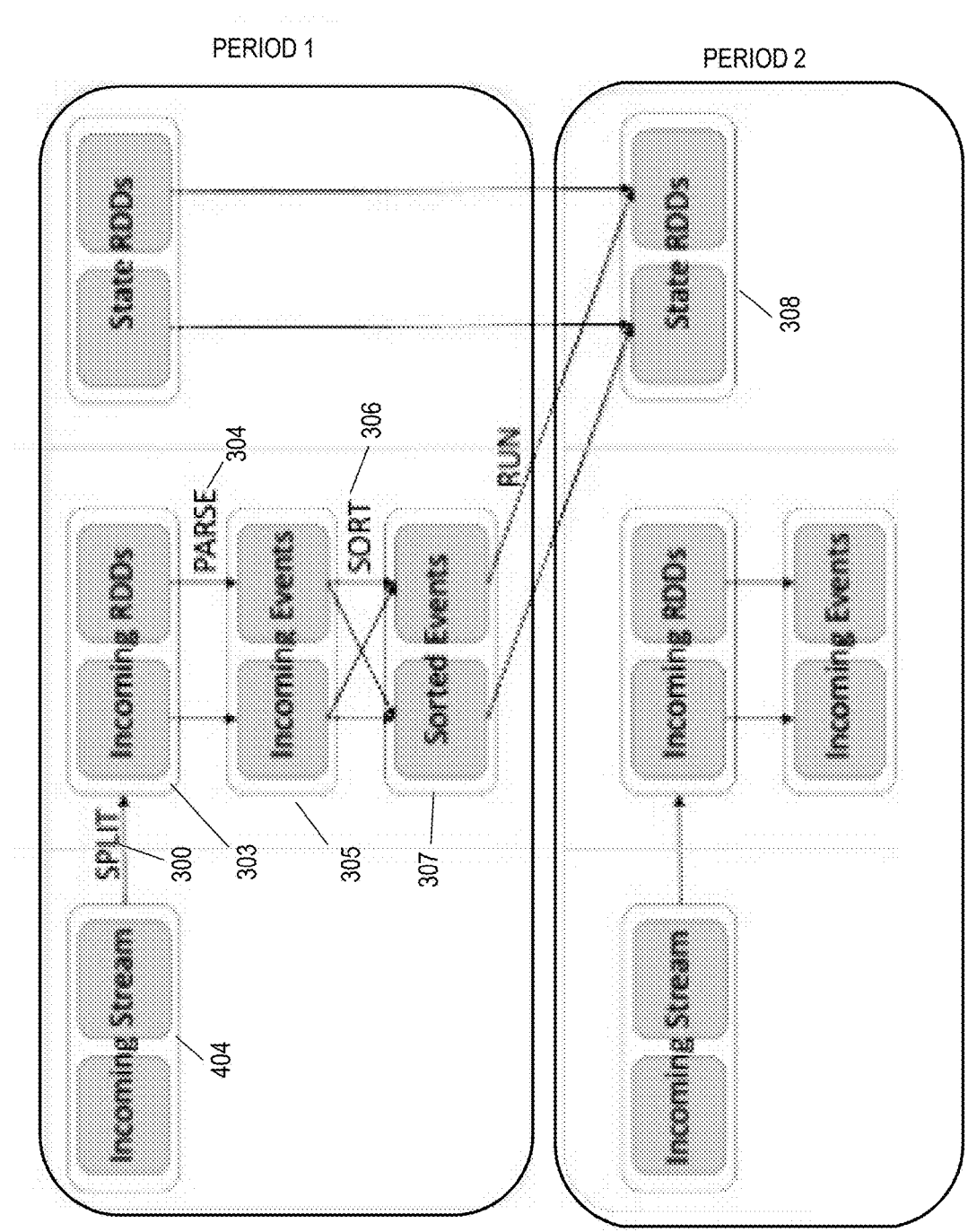
FIG. 4 shows a schematic of the process of chromatic pluralization by the chromatic pluralization framework.
Figure 5:
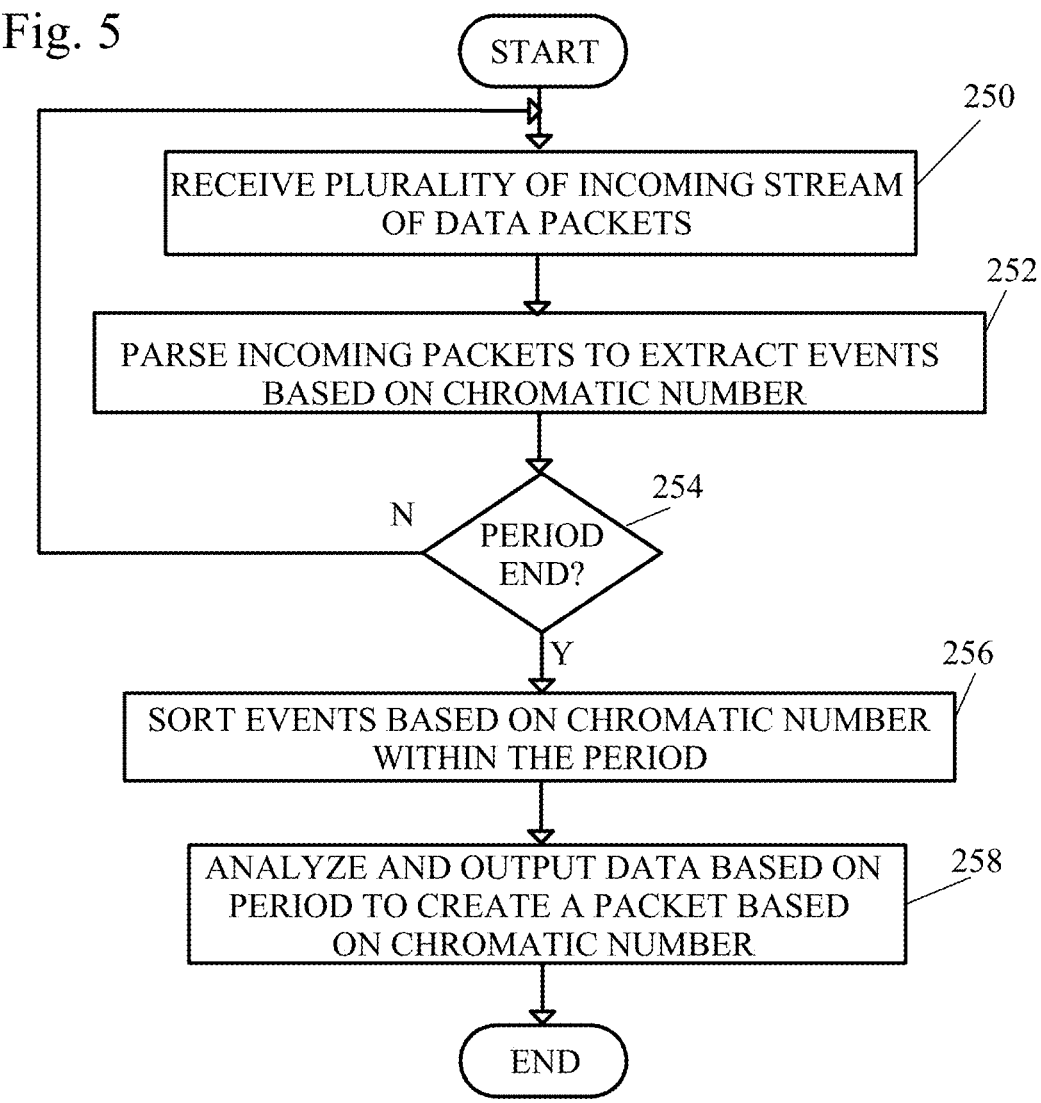
FIG. 5 shows a flow diagram of a method of chromatic pluralization.
Figure 6:
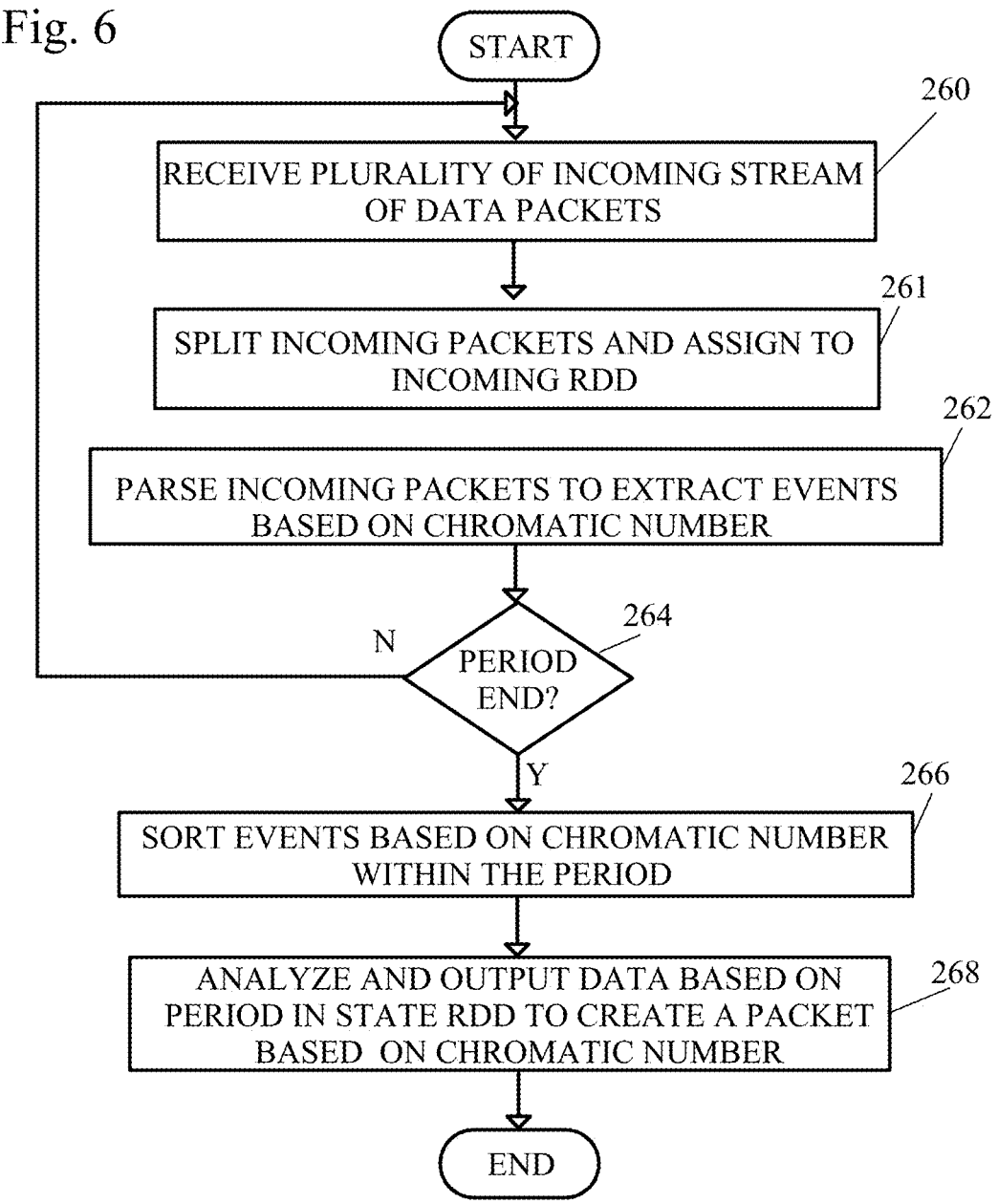
FIG. 6 shows a flow diagram of an alternate method of chromatic pluralization.

FIG. 4 show s a schematic of the process of chromatic pluralization by the chromatic pluralization framework and FIG. 6 an associated flow diagram of a method of processing data using parallel processing using multiple nodes. The chromatic pluralization framework 52 can be implemented as a multi-node model such as RDD (Resilient Distributed Datasets) which uses multi-node processing language such as SPARK RDD to parse a message from different streams of incoming data packets from sensors. These RDD's are processed by multi-nodes in parallel to parse the messages rapidly and check the messages for sorted events. Alternatively, if the data could be processed without the use of parallel processing using multiple nodes as discussed in FIG. 5.

The chromatic pluralization framework 52 receives a plurality of incoming stream of packets 404 from the HDLC framework 57. The incoming stream of data packets 404 is then split 300 by the framework 52 and assigned to incoming RDDs 303.

The incoming RDD's 303 are processed by multi-nodes in parallel to parse 304 the data packets rapidly into incoming events 305 based on the chromatic number present in the extension header of the data packets.

A sort operation 306 is conducted on the incoming events 305 extracted from the data packets based upon chromatic numbers in the header to obtain sorted events 307 within a time period. Since each data packet includes a time stamp, each event can be tagged or assigned into a time period. The period can be any length or unit of time as defined by an administrator. For example, a period can be a specific number or range of microseconds or minutes. Data analysis for a particular period is then conducted based on the chromatic numbering to output a data packet with a state associated with the time period based on the sensor data in state RDDs 308, which can then be sent on for additional processing by a central database. Since all of the RDD's are stored in memory, the analysis speed is increased significantly in comparison to sending all data to a centralized database as it occurs in real time. Preferably, data with a chromatic number processed during a first period will be processed for additional analysis during a next, subsequent period.

Referring to FIG. 6, the chromatic pluralization program 65 of the chromatic pluralization framework 52 receives a plurality of incoming streams of data packets (step 260). The incoming data packets are split, for example by the chromatic pluralization program 65 and are assigned to incoming RDDs (step 261). The incoming data packets are then parsed to extract events based on chromatic number (step 262).

If the period associated with the data packets has not ended (step 264), the method returns to step 260 of receiving the incoming stream of data packets.

If the period associated with the data packets has ended (step 264), the method continues to steps 266 of the chromatic pluralization program 65 of sorting events based on chromatic number within a period (step 266).

The sorted events within a period based on chromatic number are then analyzed and data is outputted based on period in a state RDD to create a packet based on chromatic number (step 268) and the method ends. After step 268, the packet may then be sent to a centralized database 69 for additional processing.

FIG. 5 shows a flow diagram of a method of chromatic pluralization without using RDDs.

The chromatic pluralization program 65 of the chromatic pluralization framework 52 receives a plurality of incoming streams of data packets (step 250). The incoming data packets are then parsed to extract events based on chromatic number (step 252).

If the period associated with the data packets has not ended (step 254), the method returns to step 250 of receiving the incoming stream of data packets.

If the period associated with the data packets has ended (step 254), the method continues to steps 256 of the chromatic pluralization program 65 of sorting events based on chromatic number within a period (step 256).

The sorted events within a period based on chromatic number are then analyzed and data is outputted based on period to create a packet based on chromatic number (step 258) and the method ends. After step 258, the packet may then be sent to a centralized database 69 for additional processing.

FIG. 7 illustrates internal and external components of components of the network, IoT devices 56a-56n, server computer 54, HDLC framework 57 and chromatic pluralization framework 52 in which illustrative embodiments may be implemented. In FIG. 7, IoT devices 56a-56n, server computer 54, HDLC framework 57 and chromatic pluralization framework 52 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, chromatic number program 58 and chromatic pluralization program 65 are stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800bc also includes a R/W drive or interface 832 to read from and write to one or more portable computer-readable tangible storage devices 936 such as a CD-ROM, DVD, memory stick, magnetic tape, magnetic disk, optical disk or semiconductor storage device. Chromatic number program 58 and chromatic pluralization program 65 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Chromatic number program 58 and chromatic pluralization program 65 can be downloaded to the device computer 52, server computer 54, and ICD computer 56 from an external computer via a network (for example, the Internet, a local area network or other, wide area network) and network adapter or interface 836. From the network adapter or interface 836, chromatic number program 58 and chromatic pluralization program 65 can be loaded into hard drive 830. Chromatic number program 58 and chromatic pluralization program 65 can be downloaded to the server computer 54 from an external computer via a network (for example, the Internet, a local area network or other, wide area network) and network adapter or interface 836. From the network adapter or interface 836, chromatic number program 58 and chromatic pluralization program 65 can be loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Chromatic number program 58 and chromatic pluralization program 65 can be written in various programming languages including low-level, high-level, object-oriented or non object-oriented languages. Alternatively, the functions of a chromatic number program 58 and chromatic pluralization program 65 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of pluralizing an incoming stream of data from Internet connected devices for processing by a centralized database comprising the steps of:
    a computer receiving a sensor data stream from the Internet connected devices;
    the computer obtaining a chromatic number to be used for each sensor data point within the sensor data stream;
    the computer generating a data packet with each sensor data point and the chromatic number; and
    the computer sending the data packet to a framework for pluralization and output of pluralized data based on the chromatic number.

2. The method of claim 1, wherein the chromatic number is added to a header of the data packet.

3. The method of claim 2, wherein the header is an extension header of the data packet.

4. The method of claim 1, wherein the chromatic number is based on predetermined mappings to a range of values.

5. The method of claim 1, further comprising the step of the computer sending the data packet to a high-level data link framework to add framework flags to the data packet.

6. The method of claim 1, wherein pluralization of the data packet comprises the steps of the computer:
    receiving a plurality of incoming streams of data packets each containing a sensor data point from the Internet connected devices and the chromatic number;
    parsing the incoming steam of data packets to extract events based on the chromatic number of the data packet;
    sorting the extracted events based on the chromatic number within a period of time; and
    analyzing and outputting data based on the period of time to create a new data packet based on the chromatic number.

7. The method of claim 6, wherein the pluralization of data packets is carried out on multiple nodes in parallel.

8. A computer program product for pluralizing an incoming stream of data from Internet connected devices for processing by a centralized database by a computer, the computer comprising at least one processor, one or more memories, one or more computer readable storage media, the computer program product comprising a computer readable storage medium having program instructions embodied therewith, the program instructions executable by the computer to perform a method comprising:
    receiving, by the computer, a sensor data stream from the Internet connected devices;
    obtaining, by the computer, a chromatic number to be used for each sensor data point within the sensor data stream;
    generating, by the computer, a data packet with each sensor data point and the chromatic number; and
    sending, by the computer, the data packet to a framework for pluralization and output of pluralized data based on the chromatic number.

9. The computer program product of claim 8, wherein the chromatic number is added to a header of the data packet.

10. The computer program product of claim 9, wherein the header is an extension header of the data packet.

11. The computer program product of claim 8, wherein the chromatic number is based on predetermined mappings to a range of values.

12. The computer program product of claim 8, further comprising the program instructions of sending, by the computer, the data packet to a high-level data link framework to add framework flags to the data packet.

13. The computer program product of claim 8, wherein pluralization of the data packet comprises the program instructions of:
receiving a plurality of incoming streams of data packets each containing a sensor data point from the Internet connected devices and the chromatic number;
parsing the incoming steam of data packets to extract events based on the chromatic number of the data packet;
sorting the extracted events based on the chromatic number within a period of time; and
analyzing and outputting data based on the period of time to create a new data packet based on the chromatic number.

14. The computer program product of claim 13, wherein the pluralization of data packets is carried out on multiple nodes in parallel.

15. A computer system for pluralizing an incoming stream of data from Internet connected devices for processing by a centralized database, the computer system comprising a computer comprising at least one processor, one or more memories, one or more computer readable storage media having program instructions executable by the computer to perform the program instructions comprising:
receiving, by the computer, a sensor data stream from the Internet connected devices;
obtaining, by the computer, a chromatic number to be used for each sensor data point within the sensor data stream;
generating, by the computer, a data packet with each sensor data point and the chromatic number; and
sending, by the computer, the data packet to a framework for pluralization and output of pluralized data based on the chromatic number.

16. The computer system of claim 15, wherein the chromatic number is added to a header of the data packet.

17. The computer system of claim 16, wherein the header is an extension header of the data packet.

18. The computer system of claim 15, wherein the chromatic number is based on predetermined mappings to a range of values.

19. The computer program system of claim 15, further comprising the program instructions of sending, by the computer, the data packet to a high-level data link framework to add framework flags to the data packet.

20. The computer system of claim 15, wherein pluralization of the data packet comprises the program instructions of:
receiving a plurality of incoming streams of data packets each containing a sensor data point from the Internet connected devices and the chromatic number;
parsing the incoming steam of data packets to extract events based on the chromatic number of the data packet;
sorting the extracted events based on the chromatic number within a period of time; and
analyzing and outputting data based on the period of time to create a packet based on the chromatic number.

21. The computer system of claim 20, wherein the pluralization of data packets is carried out on multiple nodes in parallel.

22. A method of pluralizing data packets of a stream of data from Internet connected devices comprising the steps of:
a computer receiving a plurality of incoming streams of data packets each containing a sensor data point from the Internet connected devices and a chromatic number;
the computer parsing the incoming steam of data packets to extract events based on the chromatic number of the data packet;
the computer sorting the extracted events based on the chromatic number within a period of time; and
the computer analyzing and outputting data based on the period of time to create a new data packet based on the chromatic number.

23. The method of claim 22, wherein the pluralization of data packets is carried out on multiple nodes in parallel.

24. The method of claim 23, wherein each of the nodes comprises resilient distributed data sets.

25. The method of claim 24, wherein after the step of the computer receiving the plurality of incoming streams of data packets each containing the sensor data point from the Internet connected devices and the chromatic number, the computer splinting the incoming data packets and assigning the data packets to resilient distributed data sets.

* * * * *